United States Patent
Chae et al.

(10) Patent No.: US 12,534,618 B2
(45) Date of Patent: Jan. 27, 2026

(54) CURABLE SILICONE COMPOSITION AND CURED PRODUCT THEREOF

(71) Applicants: Rohm and Haas Electronic Materials Korea Ltd., Chungcheongnam-do (KR); DuPont Toray Specialty Materials Kabushiki Kaisha, Tokyo (JP)

(72) Inventors: Jung Hye Chae, Hwaseong-Si (KR); Shunya Takeuchi, Ichihara (JP); Kasumi Takeuchi, Ichihara (JP)

(73) Assignees: DuPont Toray Specialty Materials Kabushiki Kaisha, Tokyo (JP); Rohm and Haas Electronic Materials Korea Ltd., Cheonan-si (KR)

( * ) Notice: Subject to any disclaimer, the term of this patent is extended or adjusted under 35 U.S.C. 154(b) by 558 days.

(21) Appl. No.: 18/058,542

(22) Filed: Nov. 23, 2022

(65) Prior Publication Data
US 2023/0174722 A1    Jun. 8, 2023

(30) Foreign Application Priority Data
Dec. 2, 2021    (JP) ................................. 2021-196115

(51) Int. Cl.
| | |
|---|---|
| *C08L 83/08* | (2006.01) |
| *C08G 77/20* | (2006.01) |
| *C08G 77/28* | (2006.01) |
| *C08J 5/18* | (2006.01) |
| *C08K 5/13* | (2006.01) |
| *C09D 183/08* | (2006.01) |
| *C08G 77/00* | (2006.01) |
| *H01L 23/29* | (2006.01) |

(52) U.S. Cl.
CPC .............. *C08L 83/08* (2013.01); *C08G 77/20* (2013.01); *C08G 77/28* (2013.01); *C08J 5/18* (2013.01); *C08K 5/13* (2013.01); *C09D 183/08* (2013.01); *C08G 77/70* (2013.01); *C08G 2190/00* (2013.01); *C08J 2383/07* (2013.01); *C08J 2383/08* (2013.01); *H01L 23/296* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,873,499 | A | * | 3/1975 | Michael .................. C08L 83/08 524/340 |
| 4,052,529 | A | * | 10/1977 | Bokerman .............. C08L 83/08 528/33 |
| 4,558,147 | A | * | 12/1985 | Eckberg ............... C08G 77/392 556/427 |
| 4,946,874 | A | * | 8/1990 | Lee ........................ C03C 25/106 522/146 |
| 5,162,389 | A | * | 11/1992 | Lee ........................ C03C 25/106 522/42 |
| 9,732,239 | B2 | | 8/2017 | Clapp et al. |
| 2016/0032102 | A1 | | 2/2016 | Srikanth et al. |
| 2020/0032111 | A1 | * | 1/2020 | Ogawa ..................... C09J 11/06 |
| 2021/0026964 | A1 | | 1/2021 | Gopal et al. |
| 2022/0112377 | A1 | * | 4/2022 | Hoffmann ............... C08L 83/08 |
| 2023/0106539 | A1 | * | 4/2023 | Ogawa ..................... G02B 1/12 528/32 |

FOREIGN PATENT DOCUMENTS

| | | |
|---|---|---|
| JP | H01259065 A | 10/1989 |
| JP | H02233764 A | 9/1990 |
| JP | 2008520809 A | 6/2008 |
| JP | 2016060782 A | 4/2016 |
| JP | 2021134329 A | 9/2021 |
| WO | 2018066379 A1 | 4/2018 |
| WO | WO 2021/167051 A1 * | 8/2021 |

* cited by examiner

Primary Examiner — Marc S Zimmer
(74) Attorney, Agent, or Firm — Ingrassia Fisher & Lorenz, LLP | IF&L

(57) ABSTRACT

The present invention relates to a curable silicone composition comprising: (A) at least one organopolysiloxane having at least two alkenyl groups per molecule; (B) at least one mercapto functional organopolysiloxane having at least two thiol groups per molecule; (C) at least one photopolymerization initiator; and, (D) 2,6-di-tert-butyl-4-methylphenol (BHT), wherein the composition has a viscosity of less than 200 mPa·s at 25° C.

11 Claims, No Drawings

CURABLE SILICONE COMPOSITION AND CURED PRODUCT THEREOF

CROSS-REFERENCE TO RELATED APPLICATIONS

This application claims priority pursuant to 35 U.S.C. 119(a) to Japanese Application No. 2021-196115, filed Dec. 2, 2021, which application is incorporated herein by reference in its entirety.

TECHNICAL FIELD

The present invention relates to a curable silicone composition and a cured product thereof.

BACKGROUND ART

Curable silicone compositions are utilized in a wide range of industrial fields because they form cured products having excellent heat resistance, cold resistance, electrical insulation, weather resistance, water repellency, and transparency. The cured product of such a curable silicone composition is also suitable as a sealant for optical materials, such as light emitting diodes (LED), because it hardly becomes discolored as compared with other organic materials, and there is less deterioration of physical properties, such as durability.

Among curable silicone compositions, UV curable silicone compositions are utilized for some products since they can avoid problems caused by heat for curing silicone compositions. In UV curable silicone compositions, mercapto functional compounds are formulated because they can provide the cured products with a high hardness.

So far, some applications for UV curable silicone compositions comprising mercapto functional compounds have been published.

For example, U.S. Pat. No. 9,732,239 discloses a composition comprising: a mercapto-functional polyorganosiloxane having the unit formula $[(CH_3)_3SiO_{1/2}]_x[(CH_3)_2SiO]_y[R(CH_3)SiO]_z$, wherein x is about 0.01 to about 0.1, y is about 0 to about 0.94, z is about 0.05 to about 0.99, and at each occurrence R is independently a mercapto($C_{1-30}$) hydrocarbyl group; at least one of (B1) a polyorganosiloxane comprising at least two aliphatic unsaturated carbon-carbon bonds, and (B2) an organic molecule comprising at least two aliphatic unsaturated carbon-carbon bonds; a filler, where the filler is present in 20 wt. % or more based on the weight of the composition; and a photoinitiator; wherein the composition is shear-thinning and UV-curable.

Also, JP-A-2016-060782 discloses a UV curable silicone resin composition including: a specific linear polyorganosiloxane containing at least one aliphatic unsaturated group; a polyorganosiloxane containing a mercaptoalkyl group bonded to a silicon atom and having a viscosity at 23° C. of 10 to 10,000 cP; an acylphosphine oxide compound selected from 2,4,6-trimethylbenzoyl-diphenylphosphine oxide and bis(2,4,6-trimethylbenzoyl)-phenylphosphine oxide; a benzotriazole compound selected from $C_{7-9}$ alkylesters of 3-(2H-benzotriazol-2-yl)-4-hydroxy-5-tert-butylbenzenepropionic acid; and a hindered amine compound selected from bis(1-octyloxy-2,2,6,6-tetramethyl-4-piperidyl) sebacate, bis(1,2,2,6,6-pentamethyl-4-piperidyl)sebacate, and methyl-1,2,2,6,6-pentamethyl-4-piperidyl sebacate, in which the ratio of the number of the mercaptoalkyl groups in the component (B) to the number of the aliphatic unsaturated groups in the component (A) is 0.1 to 10; and the amount of component (C) is 0.08 to 0.25% by weight, the amount of component (D) is 0.5 to 5.0% by weight, and the amount of component (E) is 0.1 to 0.5% by weight, with regard to 100% by weight of the total of the components (A) to (E).

Furthermore, US-A-2020/0032111 discloses a photocurable liquid silicone composition comprising: a straight chain organopolysiloxane with a viscosity at 23° C. of 50 to 100,000 mPa·s, containing at least two alkenyl groups with 2 to 12 carbon atoms in a molecule, and not containing a mercaptoalkyl group; an organopolysiloxane with a viscosity at 23° C. of 10 to 10,000 mPa·s and having at least two mercaptoalkyl groups in a molecule, in an amount such that the amount of mercaptoalkyl groups in this component is 0.2 to 3 moles with regard to 1 mole of alkenyl groups in component (A); a branched chain organopolysiloxane containing siloxane units represented by the formula: $R^3SiO_{3/2}$ where $R^3$ represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms and/or siloxane units represented by the formula: $SiO_{4/2}$, wherein the molar ratio of siloxane units represented by the formula: $R^3SiO_{3/2}$ and the siloxane units represented by the formula: $SiO_{4/2}$ of all of the siloxane units in component (C) is at least 0.5, and alkenyl groups and mercaptoalkyl groups are not included; a photo radical initiator containing a phosphorus atom; and a hindered phenol compound; wherein the amount of component (C) is 25 to 80 parts by mass, the amount of component (D) is 0.01 to 1.0 parts by mass, and the amount of component (E) is 0.001 to 1.0 parts by mass, with regard to 100 parts by mass of a total of component (A) through component (E).

However, in conventional curable silicone compositions comprising mercapto functional compounds, there is a problem that the composition has a too high viscosity and the hardness of a cured product of the composition is not enough. Furthermore, there is also a problem that the conventional curable silicone compositions comprising mercapto functional compounds do are not stable enough and thus they cause gelation or an increase of viscosity while they are stored before a polymerization process starts, since the mercapto functional compounds are generally reactive.

SUMMARY OF THE INVENTION

An objective of the present invention is to provide a curable silicone composition which cures quickly, has a low viscosity, and possesses sufficient storage stability, and which can provide a cured product having a high hardness.

The above objective of the present invention can be achieved by a curable silicone composition comprising: at least one organopolysiloxane having at least two alkenyl groups per molecule; at least one mercapto functional organopolysiloxane having at least two thiol groups per molecule; at least one photopolymerization initiator; and 2,6-di-tert-butyl-4-methylphenol (BHT), wherein the composition has a viscosity of less than 200 mPa·s at 25° C.

The (A) organopolysiloxane having at least two alkenyl groups per molecule may comprises at least one cyclic organopolysiloxane.

The cyclic organopolysiloxane may be represented by the following formula (I): $(R_2SiO)_m$ in which, R indicates the same or different monovalent hydrocarbon, which can be optionally substituted with at least one halogen, wherein at least two of R per molecule represent alkenyl groups; and m is an integer of 4 to 50.

The (A) organopolysiloxane having at least two alkenyl groups per molecule may have alkenyl groups in an amount of 20 mol % or more and 80 mol % or less relative to the total amount of the silicon atom-bonded organic groups.

The (A) organopolysiloxane having at least two alkenyl groups per molecule may comprise the cyclic organopolysiloxane having at least two alkenyl groups per molecule in an amount of 50% by weight or more, relative to the total amount of the component (A).

The (A) organopolysiloxane having at least two alkenyl groups per molecule may include linear organopolysiloxane, branched organopolysiloxane, and/or resinous organopolysiloxane in an amount of 10% by weight or less relative to the total amount of the composition, or the (A) organopolysiloxane having at least two alkenyl groups per molecule is free of linear organopolysiloxane, branched organopolysiloxane, and/or resinous organopolysiloxane.

The (B) mercapto functional organopolysiloxane may have thiol groups in an amount of 10 mol % or more and 80 mol % or less relative to the total amount of the silicon atom-bonded organic groups.

The (B) mercapto functional organopolysiloxane may comprise (mercaptopropyl)methylsiloxane homopolymer and/or $MT^{SH}Q$ type resin.

The (A) organopolysiloxane having at least two alkenyl groups per molecule may be present in an amount of 10% by weight or more and 70% by weight or less relative to the total weight of the composition.

The (B) mercapto functional organopolysiloxane may be present in an amount of 30% by weight or more and 90% by weight or less relative to the total weight of the composition.

The molar ratio of the thiol groups to alkenyl groups included in the composition may be 0.5 or more and 2.0 or less.

The (C) photopolymerization initiator may comprise the following: (c-1) an alpha-hydroxyacetophenone, (c-2) a combination of an alpha-hydroxyacetophenone and an alpha-aminoalkylphenone, or (c-3) a combination of an alpha-hydroxyacetophenone and a mono-acylphosphine oxide.

The present invention also relates to a sealing agent or sheet film formed with the curable silicone composition according to the present invention.

Effects of the Invention

The present invention can provide a fast-curable silicone composition which cures quickly and exhibits a low viscosity and a high hardness when it is cured. In addition, the curable silicone composition has sufficient storage stability.

MODE FOR CARRYING OUT THE INVENTION

After diligent research, the inventors have surprisingly discovered that a fast curable, low viscose, and good storage-stable silicone composition can be obtained with a combination of the components (a) to (d) above. In addition, the present inventors have surprisingly discovered that the composition can provide a cured product having a high hardness, and thus completed the present invention.

Thus, the composition according to the present invention is a curable silicone composition comprising: at least one organopolysiloxane having at least two alkenyl groups per molecule; at least one mercapto functional organopolysiloxane having at least two thiol groups per molecule; at least one photopolymerization initiator; and 2,6-di-tert-butyl-4-methylphenol (BHT), wherein the composition has a viscosity of less than 200 mPa·s at 25° C.

Hereinafter, the composition, process, and use according to the present invention will be explained in a more detailed manner.

[Curable Silicone Composition]

The curable silicone composition according to the present invention comprises (A) at least one organopolysiloxane having at least two alkenyl groups per molecule, (B) at least one mercapto functional organopolysiloxane having at least two thiol groups per molecule, (C) at least one photopolymerization initiator, and (D) 2,6-di-tert-butyl-4-methylphenol (BHT).

The curable silicone composition according to the present invention has a low viscosity. In particular, the curable silicone composition has a viscosity of less than 200 mPa·s at 25° C. Preferably, the curable silicone composition has a viscosity of less than 175 mPa·s at 25° C., more preferably 150 mPa·s at 25° C. The viscosity herein can be measured with a rheometer from Antonpaar with 40 mm cone plate at 2 degree angle at a shear rate of 20/s.

The each components of the curable silicone composition will be explained below.

(A) Organopolysiloxane Having at Least Two Alkenyl Groups Per Molecule

The curable silicone composition according to the present invention comprises at least one organopolysiloxane having at least two alkenyl groups per molecule as component (A). The composition according to the present invention may comprise one type of (A) organopolysiloxane or may comprise two or more types of (A) organopolysiloxane in combination.

The (A) organopolysiloxane having at least two alkenyl groups per molecule may be a linear, branched, partially-branched, cyclic, or resinous. The term "linear" here means that the organopolysiloxane has a straight chain structure in the molecule and does not have a branched chain nor a branched structure. The term "resinous" here means that the organopolysiloxane has a branched or three-dimensional network structure in the molecule. Preferably, the (A) organopolysiloxane having at least two alkenyl groups per molecule has a cyclic structure.

The alkenyl group included in the component (A) may include $C_{2-12}$ alkenyl groups, such as a vinyl, allyl, butenyl, pentenyl, hexenyl, heptenyl, octenyl, nonenyl, decenyl, undecenyl, and dodecenyl groups; and preferably a vinyl group.

Other silicon atom-bonded organic groups other than alkenyl groups included in component (A) may include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl group; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. It should be noted that a small amount of hydroxyl group or alkoxy group such as methoxy or ethoxy group may be bonded to the silicon atom in the component (A), provided that this does not adversely affect the aim of the present invention. Preferably, the silicon atom-bonded organic groups other than alkenyl groups comprise a $C_{1-12}$ alkyl group, in particular a methyl group. Component (A) may not include any thiol groups.

In one preferred embodiment of the present invention, the (A) organopolysiloxane having at least two alkenyl groups per molecule comprises a cyclic organopolysiloxane which can be represented by the following formula (I):

$$(R_2SiO)_m \qquad \text{(A) average structural formula (I):}$$

in which, R indicates the same or different monovalent hydrocarbon, which can be optionally substituted with at least one halogen, wherein at least two of R per molecule represent alkenyl groups; and m is an integer such that the cyclic organopolysiloxane has a viscosity of less than 100 mPa·s at 25° C.

In formula (I), the monovalent hydrocarbon for R, which can be optionally substituted with at least one halogen, may include, $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl group; $C_{2-12}$ alkenyl groups, such as a vinyl, allyl, butenyl, pentenyl, hexenyl, heptenyl, octenyl, nonenyl, decenyl, undecenyl, and dodecenyl groups; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. The monovalent hydrocarbon in $R^1$ may include a small amount of hydroxyl group or alkoxy group such as a methoxy or ethoxy group, provided that this does not adversely affect the aim of the present invention. Preferably, the monovalent hydrocarbon in R represents a $C_{1-12}$ alkyl group, in particular a methyl group, and a $C_{2-12}$ alkenyl groups, in particular a vinyl group.

In formula (I), m may be an integer from 4 to 50, preferably from 4 to 30, more preferably from 4 to 20, even more preferably from 4 to 10, and in particular 4 to 8.

Component (A) has a low weight-average molecular weight (g/mol). For example, the weight-average molecular weight of component (A) is preferably 3,000 or less, more preferably 2,000 or less, even more preferably 1,000 or less, and in particular 500 or less. The lower limit of the weight-average molecular weight of component (A) is not particularly limited, but for example 100 or more. The weight-average molecular weight can be measured (in terms of polystyrene) using gel permeation chromatography (GPC).

The amount of the alkenyl groups relative to the total amount of the silicon atom-bonded organic groups in the (A) organopolysiloxane is not particularly limited, but is for example, 20 mol % or more, preferably 30 mol % or more, more preferably 40 mol % or more, and in particular 45 mol % or more, and is in general 80 mol % or less, preferably 70 mol % or less, more preferably 60 mol % or less, and in particular 55 mol % or less, relative to the total amount of the silicon atom-bonded organic groups. The amount of the alkenyl groups can be measured, for example, with analytical methods such as Fourier transform infrared spectroscopy (FT-IR), nuclear magnetic resonance (NMR), or the following titration method.

The method for quantifying the amount of alkenyl groups in organopolysiloxane by the titration method will be described below. The content of alkenyl groups in organopolysiloxane can be accurately quantified by the titration method known as the Wijs method. The principle is described below. First, alkenyl groups present in organopolysiloxane raw materials and iodine monochlorides are subjected to an addition reaction as shown in Equation (1). Next, by the reaction represented by Equation (2), iodine monochlorides in an excess quantity are reacted with potassium iodides so as to be released as iodines. The free iodines are then titrated with a sodium thiosulfate solution.

$$CH_2\!=\!CH\!-\!+2ICl \rightarrow CH_2I\!-\!CHCl\!-\!+ICl \text{ (excess quantity)} \qquad \text{Equation (1)}$$

$$ICl+KI \rightarrow I_2+KCl \qquad \text{Equation (2)}$$

The amount of the alkenyl groups present in the organopolysiloxane can be quantified from the difference between the amounts of sodium thio sulfate required for the titration above and for a blank solution prepared separately.

In one embodiment of the present invention, component (A) comprises the cyclic organopolysiloxane having at least two alkenyl groups per molecule in an amount of 50% by weight or more, preferably 60% by weight or more, more preferably 70% by weight or more, even more preferably 80% by weight or more, preferentially 90% by weight or more, and in particular 95% by weight or more, relative to the total amount of the component (A).

In one embodiment of the present invention, the component (A) includes linear organopolysiloxane, branched organopolysiloxane, and/or resinous organopolysiloxane in an amount of 10% by weight or less, preferably 5% by weight or less, more preferably 3% by weight or less, and in particular 1% by weight or less, relative to the total amount of the composition.

In another embodiment of the present invention, component (A) is free of linear organopolysiloxane, branched organopolysiloxane, and/or resinous organopolysiloxane. In this embodiment, component (A) consists of the cyclic organopolysiloxane having at least two alkenyl groups per molecule.

The (A) organopolysiloxane may be present in an amount of 10% by weight or more, preferably 15% by weight or more, more preferably 20% by weight or more, and may be present in an amount of 70% by weight or less, preferably 60% by weight or less, and more preferably 50% by weight or less, relative to the total weight of the composition.

(B) Mercapto Functional Organopolysiloxane Having at Least Two Thiol Groups Per Molecule The curable silicone composition according to the present invention comprises at least one mercapto functional organopolysiloxane having at least two thiol groups per molecule as component (B). The composition according to the present invention may comprise one type of the (B) mercapto functional organopolysiloxane, or may comprise two or more types of the (B) mercapto functional organopolysiloxane in combination.

The structure of the mercapto functional organopolysiloxane can be linear, branched, partially-branched, cyclic, or resinous. In one preferred embodiment of the present invention, the mercapto functional organopolysiloxane has a linear structure or a branched structure.

The mercapto functional organopolysiloxane has at least two thiol groups per molecule. The mercapto functional organopolysiloxane may have the thiol groups at the end of the polymer chain or at silicon atoms other than the ends of the polymer chain, i.e. as pendant groups. In one preferred embodiment of the present invention, the mercapto functional organopolysiloxane has the thiol groups at silicon atoms other than the ends of the polymer chain, i.e. as pendant groups, and does not have any thiol groups at the ends of the polymer chain.

Silicon atom-bonded organic groups other than thiol groups included in the mercapto functional organopolysiloxane may include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl group; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. Preferably, the silicon atom-bonded organic groups other than thiol groups comprise a $C_{1-12}$ alkyl group, in particular a methyl group.

The amount of the thiol groups relative to the total amount of the silicon atom-bonded organic groups in the (B) mercapto functional organopolysiloxane is not particularly limited, but preferably, 5 mol % or more, more preferably 10 mol % or more, and in general 80 mol % or less, and preferably 65 mol % or less, relative to the total amount of the silicon atom-bonded organic groups. The amount of the thiol groups can be measured, for example, with analytical methods such as Fourier transform infrared spectroscopy (FT-IR) or nuclear magnetic resonance (NMR).

The (B) mercapto functional organopolysiloxane may have a viscosity of from 30 cSt or greater, preferably 50 cSt or greater, and more preferably 70 cSt or greater, and may have a viscosity of 20000 cSt or less, preferably 17500 cSt or less, and more preferably 15000 cSt or less at 25° C. The viscosity of this silicone may be measured according to standard ASTM D-445.

The weight average molecular weight (Mw, g/mol) of themercapto functional organopolysiloxane is not particularly limited, but is in general 500 or greater, preferably 1,000 or greater, and is in general 30,000 or less, preferably 20,000 or less, more preferably 15,000 or less, and even more preferably 10,000 or less. The weight average molecular weight can be measured by, for example, gel permeation chromatography (GPC).

In one preferred embodiment of the present invention, the (B) mercapto functional organopolysiloxane is a branched polymer, which does not have a cross-linked structure or a three-dimensional network structure. As a preferred example of the branched polymer of the (B) mercapto functional organopolysiloxane, mention can be made of (mercaptopropyl)methylsiloxane homopolymer, which can be represented by the following formula (II):

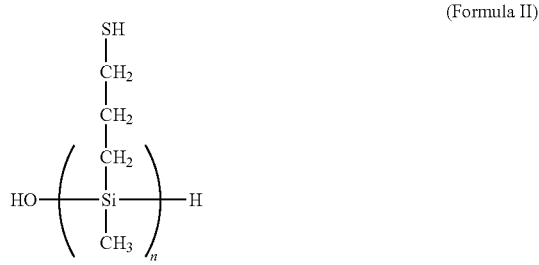

(Formula II)

wherein n is an integer ranging from 5 to 200, preferably 10 to 150, more preferably 15 to 100, and even more preferably 20 to 85.

Commercialized products of (mercaptopropyl)methylsiloxane homopolymer include SMS-992 sold by from Gelest Inc.

In a specific embodiment of the present invention, when the (B) mercapto functional organopolysiloxane is the branched polymer, the amount of the thiol groups relative to the total amount of the silicon atom-bonded organic groups in the (B) mercapto functional organopolysiloxane is 15 mol % or more, more preferably 30 mol % or more, and in general 80 mol % or less, and preferably 65 mol % or less, relative to the total amount of the silicon atom-bonded organic groups.

In another embodiment of the present invention, the (B) mercapto functional organopolysiloxane can be resinous.

In one embodiment of the present invention, the (B) resinous mercapto functional organopolysiloxane can be represented by the following formula (III):

$$(R^1{}_3SiO_{1/2})_a(R^1{}_2SiO_{2/2})_b(R^1SiO_{3/2})_c(SiO_{4/2})_d(XO_{1/2})_e \quad \text{average unit formula (III):}$$

in which, $R^1$ indicates the same or different a monovalent hydrocarbon group or a thiol group, which can be optionally substituted with at least one halogen, wherein at least two of $R^1$ per molecule represent thiol groups; X represents a hydrogen atom or an alkyl group; and $0 \le a < 1$, $0 \le b < 1$, $0 \le c < 0.95$, $0 \le d < 0.9$, $0 \le e < 0.4$, $a+b+c+d=1.0$, and $c+4:1>0$ are satisfied.

In formula (III), the monovalent hydrocarbon for $R^1$, which can be optionally substituted with at least one halogen, may include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl group; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. Preferably, the monovalent hydrocarbon comprises a $C_{1-12}$ alkyl group, in particular a methyl group.

In formula (III), X represents a hydrogen atom or an alkyl group. The alkyl group in X preferably represents a $C_{1-3}$ alkyl group such as a methyl, ethyl, or propyl group.

In one embodiment of the present invention, in formula (III), a ranges preferably from $0.1 \le a \le 0.8$, more preferably in the range of $0.2 \le a \le 0.65$, and even more preferably in the range of $0.3 \le a \le 0.5$. In formula (III), b ranges preferably from $0 \le b \le 0.5$, more preferably from $0 \le b \le 0.3$, and even more preferably from $0 \le b \le 0.1$. In formula (III), c ranges preferably from $0.1 \le c \le 0.8$, more preferably from $0.2 \le c \le 0.65$, and even more preferably from $0.3 \le c \le 0.5$. In formula (III), d ranges preferably from $0.05 \le d \le 0.5$, more preferably from $0.1 \le d \le 0.4$, and even more preferably from $0.1 \le d \le 0.3$. In formula (III), e ranges preferably from $0 \le e \le 0.2$, more preferably from $0 \le e \le 0.1$, and even more preferably from $0 \le e \le 0.05$.

In another embodiment of the present invention, the (B) resinous mercapto functional organopolysiloxane can be represented by the following formula (III'):

$$(R^1{}_3SiO_{1/2})_a(R^1{}_2SiO_{2/2})_b(R^2SiO_{3/2})_c(SiO_{4/2})_d(XO_{1/2})_e \quad \text{average unit formula (III'):}$$

in which, $R^1$ indicates the same or different monovalent hydrocarbon, which can be optionally substituted with at least one halogen; $R^2$ indicates a thiol group; X represents a hydrogen atom or an alkyl group; and; and $0 \le a < 1$, $0 \le b < 1$, $0 < c < 0.95$, $0 \le d < 0.9$, $0 \le e < 0.4$, and $a+b+c+d=1.0$ are satisfied, wherein the organopolysiloxane has at least two $R^2$ radical per molecule.

The same explanations about monovalent hydrocarbon, X, a, b, c, d, and e in formula (III) can be applied to formula (III').

In one embodiment, the resinous mercapto functional organopolysiloxane represented by formula (III) or (III') does not include any D unit represented by $(SiO_{2/2})$. In another embodiment, the resinous mercapto functional organopolysiloxane represented by formula (III) can be represented by MTSHQ resin.

Commercialized products of the resinous mercapto functional organopolysiloxane include: Resinous mercapto functional organopolysiloxane represented by a formula $M_{42}T^{SH}_{41}Q_{17}$, and Resinous mercapto functional organopolysiloxane represented by a formula $M_{44}T^{SH}_{42}Q_{12}$.

In a specific embodiment of the present invention, when the (B) mercapto functional organopolysiloxane is resinous, the amount of the thiol groups relative to the total amount of the silicon atom-bonded organic groups in the (B) mercapto functional organopolysiloxane is 5 mol % or more, more preferably 10 mol % or more, and in general 35 mol % or less, and preferably 25 mol % or less, relative to the total amount of the silicon atom-bonded organic groups.

The (B) mercapto functional organopolysiloxane may be present in an amount of 20% by weight or more, preferably 30% by weight or more, more preferably 40% by weight or more, even more preferably 50% by weight or more, and in particular 60% by weight or more, and may be present in an amount of 90% by weight or less, preferably 85% by weight or less, more preferably 80% by weight or less, and even more preferably 75% by weight or less, relative to the total weight of the composition.

The molar ratio of the thiol groups to alkenyl groups included in the curable silicone composition of the present invention may be 0.5 or more, preferably 0.75 or more, more preferably 0.8 or more, and even more preferably 0.85 or more; and may be 5.0 or less, preferably 3.0 or less, more preferably 2.0 or less, even more preferably 1.5 or less, and in particular 1.2 or less.

(C) Photopolymerization Initiator

The curable silicone composition according to the present invention comprises at least one photopolymerization initiator as component (C). The composition according to the present invention may comprise one type of the (C) photopolymerization initiator, or may comprise two or more types of (C) photopolymerization initiators in combination.

The type of the (C) photopolymerization initiator is not particularly limited as long as it is dissolved in the organopolysiloxane components of the present invention. The (C) photopolymerization initiator can be selected from alkylphenone-type photopolymerization initiators, acylphosphine oxide-type photopolymerization initiators, intramolecular hydrogen abstraction-type photopolymerization initiators, and oxime ester-type photopolymerization initiators.

The alkylphenone-type photopolymerization initiators may be selected from, for example, hydroxyalkylphenones, such as 1-hydroxycyclohexyl-phenylketone, which is sold by IGM RESINS B.V. under the name of Omnirad 184; hydroxyacetophenones, such as 2-hydroxy-2-methyl-1-phenyl-1-propanone, which is sold by IGM RESINS B.V. under the name of Omnirad 1173, 2-hydroxy-4'-(2-hydroxyethoxy)-2-methylpropiophenone, which is sold by IGM RESINS B.V. under the name of Omnirad 2959, oligo-[2-hydroxy-2-methyl-1-[4-(1-methylvinyl)-phenyl]-propanone], and 1,1'-(methylene-di-4,1-phenylene) bis[2-hydroxy-2-methyl-1-propanone], which is sold by IGM RESINS B.V. under the name of Omnirad 127; and aminoacetophenones, such as 2-methyl-1-[4-(methylthio)phenyl]-2-(4-morpholinyl)-propane-1-one, which is sold by IGM RESINS B.V. under the name of Omnirad 907, 2-dimethylamino-2-(4-methylbenzyl)-1-(4-morpholine-4-yl-phenyl)-butane one, which is sold by IGM RESINS B.V. under the name of Omnirad 379EG, 2-benzyl dimethylamino-1-(3,4-dimethoxy-phenyl)-butane-1-one, 2-benzyl-2-dimethylamino-1-(4-morpholine-4-yl-phenyl)-butane-1-on, 2-(dimethylamino)-1-(4-morpholinophenyl)-2-benzyl-1-butanone, which is sold by IGM RESINS B.V. under the name of Omnirad 369, and 2-methyl-1-(4-methylsulfanyl-phenyl)-2-morpholine-4-yl-propane-1-one; 2,2-dimethoxy-2-phenylacetophenone, 4-phenoxydichloro acetophenone, 4-t-butyl-dichloroacetophenone, 4-t-butyltrichloroacetophenone and a combination thereof.

The acylphosphine oxide-type photopolymerization initiators may be selected from, for example, (2,4,6-trimethylbenzoyl)-diphenyl-phosphine oxide, which is sold by IGM RESINS B.V. under the name of Omnirad TPO-H, phenyl-(2,4,6-trimethylbenzoyl)-phosphoric acid ethyl ester, which is sold by IGM RESINS B.V. under the name of Omnirad TPO-L, and bis(2,4,6-trimethylbenzoyl)phenylphosphine oxide, which is sold by IGM RESINS B.V. under the name of Omnirad 819, bis(2,6-dimethoxybenzoyl)-2,4,4-trimethyl-pentylphosphine oxide, and a combination thereof.

The intramolecular hydrogen abstraction-type photopolymerization initiators may be selected from, for example, oxyphenyl-type photopolymerization initiators such as methylbenzoylformate, which is sold by IGM RESINS B.V. under the name of Omnirad MBF. As the intramolecular hydrogen abstraction-type photopolymerization initiators, mention can be made of an oxyethoxy phenylacetyl derivative, such as a blend of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester, which is sold by IGM RESINS B.V. under the name of Omnirad 754, and a combination thereof.

In one specific embodiment of the present invention, the (C) photopolymerization initiator comprises alkylphenone-type photopolymerization initiators and/or acylphosphine oxide-type photopolymerization initiators.

Another embodiment of the present invention, the (C) photopolymerization initiator may comprise the following: (c-1) an alpha-hydroxyacetophenone, (c-2) a combination of an alpha-hydroxyacetophenone and an alpha-aminoalkylphenone, or (c-3) a combination of an alpha-hydroxyacetophenone and a mono-acylphosphine oxide.

Examples of alpha-hydroxyacetophenone may include 2-hydroxy-2-methyl-1-phenyl propanone (by IGM Resins B. V.; brand name: Omnirad 1173); 2-hydroxy-4'(2-hydroxyethoxy) methylpropiophenone (by IGM Resins B. V.; brand name Omnirad 2959), oligo-[2-hydroxy-2-methyl-1-[4-(1-methylvinyl)-phenyl]-propanone], 1,1'-(methylene-di-4,1-phenylene) bis [2-hydroxy-2-methyl-1-propanone] (by IGM Resins B. V.; brand name: Omnirad 127D), and 1-hydroxycyclohexyl-phenylketone (by IGM Resins B. V.; brand name: Omnirad 184).

The photopolymerization initiator (c-1) may furthermore contain a compound having an acetophenone structure other than alpha-hydroxyacetophenone in addition to the alpha-hydroxyacetophenone. Examples of compounds having such an acetophenone structure include, but are not particularly limited to, 4-phenoxydichloroacetophenone, 4-t-butyldichloroacetophenone, 4-t-butyltrichloroacetophenone, and diethoxyacetophenone.

In a particularly preferred embodiment, the alpha-hydroxyacetophenone-containing photo-initiator (c-1) contains only alpha-hydroxyacetophenone and either contains no other photo-initiator or contains another photo-initiator in an amount 10% by mass or less, 5% by mass or less, or 3% by mass or less based on the total mass of component (C).

Examples of alpha-aminoalkylphenones in (c-2) combinations of an alpha-hydroxyacetophenone and an alpha-aminoalkylphenone may include 2-methyl-1-[4-(methylthio)phenyl]-2-(4-morpholinyl)-propan-1-one (by IGM Resins B. V.; brand name: Omnirad 907), 2-dimethylamino-2-(4-methylbenzyl)-1-(4-morpholin-4-yl-phenyl)-butan-1-one (by IGM Resins B. V.; brand name: Omnirad 379EG), 2-benzyl-2-dimethylamino-1-(3,4-dimethoxy-phenyl)-butan-1-one, 2-benzyl-2-dimethylamino-1-(4-morpholin-4-yl-phenyl)-butan-1-one, 2-(dimethylamino)-1-(4-morpholino-phenyl)-2-benzyl-1-butanone (by IGM Resins B. V.; brand name: Omnirad 369), and 2-methyl-1-(4-methylsulfanyl-phenyl)-2-morpholin-4-yl-propan-1-one.

The weight ratio between the alpha-hydroxyacetophenone and alpha-aminoalkylphenone in (c-2) combinations of an alpha-hydroxyacetophenone and an alpha-aminoalkylphenone is not particularly limited, but the mass ratio of the alpha-hydroxyacetophenone to the alpha-aminoalkylphenone may be, for example, 0.1 to 100, preferably 0.5 to 50, and more preferably 1 to 20.

In a particularly preferred embodiment, a photo-initiator comprising (c-2) a combination of an alpha-hydroxyacetophenone and an alpha-aminoalkylphenone will consist of only an alpha-hydroxyacetophenone and an alpha-aminoalkylphenone, and will either contain no other photo-initiator or contain another photo-initiator in an amount 10% by mass or less, 5% by mass or less, or 1% by mass or less based on the total mass of component (C).

Examples of mono-acylphosphine oxides in (c-3) combinations of an alpha-hydroxyacetophenone and a mono-acylphosphine oxide include (2,4,6-trimethylbenzoyl)-diphenyl-phosphine oxide (by IGM Resins B. V.; brand name: Omnirad TPO-H) and phenyl-(2,4,6-trimethylbenzoyl)-phosphinate ethyl ester (by IGM Resins B. V.; brand name: Omnirad TPO-L).

The weight ratio between the alpha-hydroxyacetophenone and mono-acylphosphine oxide in (c-3) combinations of an alpha-hydroxyacetophenone and a mono-acylphosphine oxide is not particularly limited, but the mass ratio of the alpha-hydroxyacetophenone to the mono-acylphosphine oxide may be, for example, 0.1 to 100, preferably 0.5 to 50, and more preferably 0.8 to 20.

In a particularly preferred embodiment, the photopolymerization initiator comprising (c-3) a combination of an alpha-hydroxyacetophenone and a mono-acylphosphine oxide will consist of only an alpha-hydroxyacetophenone and a mono-acylphosphine oxide, and will either contain no other photo-initiator or contain another photo-initiator in an amount 10% by mass or less, 5% by mass or less, or 1% by mass or less based on the total mass of component (C).

In the present specification, examples of "other photo-initiators" include, but are not limited to, photopolymerization initiators other than those listed as components of (c-1) through (c-3), such as bisacylphosphine oxides, trisacylphosphine oxides, phenyl glyoxalates, thioxanthone, benzoin ethers, and oxime ester. The (C) photopolymerization initiator of the present disclosure may either include no photopolymerization initiator other than an alpha-hydroxyacetophenone, alpha-aminoalkylphenone, or mono-acylphosphine oxide, or may contain them in an amount 10% by mass or less, 5% by mass or less, or 1% by mass or less, based on the total mass of component (C).

The (C) photopolymerization initiator may be present in an amount of 0.001% by weight or more, preferably 0.005% by weight or more, more preferably 0.01% by weight or more, and even more preferably 0.05% by weight or more, and may be present in an amount of 5% by weight or less, preferably 3% by weight or less, more preferably 2% by weight or less, and even more preferably 1.5% by weight or less, relative to the total weight of the composition.

(D) 2,6-di-tert-butyl-4-methylphenol (BHT)

The curable silicone composition according to the present invention comprises 2,6-di-tert-butyl-4-methylphenol (BHT) as an essential component of component (D).

The (D) 2,6-di-tert-butyl-4-methylphenol may be present in an amount of 0.05% by weight or more, preferably 0.1% by weight or more, more preferably 0.5% by weight or more, and even more preferably 1% by weight or more, and may be present in an amount of 5% by weight or less, preferably 3% by weight or less, more preferably 2% by weight or less, and even more preferably 1.5% by weight or less, relative to the total weight of the composition.

Other Ingredient (E) Anti-Gelling Agent

The curable silicone composition according to the present invention may comprise at least one anti-gelling agent other than (D) 2,6-di-tert-butyl-4-methylphenol (BHT) as component (E). The composition according to the present invention may comprise one type of the (E) anti-gelling agent, or may comprise two or more types of the (E) anti-gelling agents in combination.

The (E) anti-gelling agent of the present invention can be selected from (e-1) photopolymerization inhibitors and (e-2) antioxidants.

(e-1) Photopolymerization Inhibitor

The (e-1) photopolymerization inhibitor may comprise one type of photopolymerization inhibitor, or may comprise two or more types of photopolymerization inhibitors in combination.

The (e-1) photopolymerization inhibitor of the present invention comprises at least one alkoxylated polyol derived (meth)acrylate or at least one quinone derivative compound.

The alkoxylated polyol derived (meth)acrylate may be mono-functional, bi-functional, tri-functional, or tetra-functional.

The polyol moiety of the alkoxylated polyol derived (meth)acrylate may be selected from di- to octa-hydric polyols. Examples of the di- to octa-hydric polyols include dihydric alcohols, such as ethylene glycol, propylene glycol, butylene glycol, hexamethylene glycol, and neopentyl glycol; trihydric alcohols, such as glycerol, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolethane, and trimethylolpropane; tetrahydric alcohols, such as pentaerythritol, 1,2,3,4-pentanetetrol, 2,3,4,5-hexanetetrol, 1,2,4,5-pentanetetrol, and 1,3,4,5-hexanetetrol.

The alkoxylated portion of the alkoxylated polyol derived (meth)acrylate may be selected from methoxylated portion, ethoxylated portion, butoxylated portion, and propoxylated portion. The repeat number of the alkoxylated portion in the alkoxylated polyol derived (meth)acrylate is not particularly limited, but is in general from 1 to 30, preferably 1 to 20, more preferably 1 to 10, and even more preferably from 1 to 5.

As the mono-functional alkoxylated polyol derived (meth)acrylate, mention can be made of methoxyethylene glycol acrylate, methoxypolypropylene glycol acrylate, methoxypolyethylene glycol acrylate, ethoxydiethylene glycol acrylate, and neopentyl glycol propoxylate methylether monoacrylate.

As the bi-functional alkoxylated polyol derived (meth)acrylate, mention can be made of alkoxylated neopentyl glycol diacrylate, such as ethoxylated neopentyl glycol diacrylate, and propoxylated neopentyl glycol diacrylate.

As the tri-functional alkoxylated polyol derived (meth)acrylate, mention can be made of ethoxylated trimethylolpropane triacrylate, propoxylated trimethylolpropane triacrylate, and propoxylated glycerol triacrylate. As a commercialized product of propoxylated glycerol triacrylate, mention can be made of Genorad 16 sold by Rahn.

As the tetra-functional alkoxylated polyol derived (meth) acrylate, mention can be made of ethoxylated pentaerythritol tetraacrylate.

The quinone derivative compound may be quinone methide compounds. As one specific embodiment of the quinone methide compounds, mention can be made of 2,6-bis(1,1-dimethylethyl) (phenylenemethylene)cyclohexa-2,5-dien-1-one, which is sold under the name of Irgastab® UV22 sold by BASF.

In one preferred embodiment of the present invention the (e-1) photopolymerization inhibitor can be selected from tri-functional alkoxylated polyol derived (meth)acrylate.

The (e-1) photopolymerization inhibitor may be present in an amount of 0.005% by weight or more, preferably 0.01% by weight or more, more preferably 0.03% by weight or more, and even more preferably 0.05% by weight or more, and may be present in an amount of 5% by weight or less, preferably 3% by weight or less, more preferably 2% by weight or less, and even more preferably 1% by weight or less, relative to the total weight of the composition.

(e-2) Antioxidant

The (e-2) antioxidant may comprise one type of antioxidant, or may comprise two or more types of antioxidants in combination.

Such an antioxidant is not particularly limited, but may include a hindered phenol-type antioxidant, a phosphorus-type antioxidant, a lactone-type antioxidant, a hydroxylamine-type antioxidant, a vitamin E-type antioxidant, and a sulfur-based antioxidant.

As the hindered phenol-type antioxidant, mention can be made of triethylene glycol-bis [3-(3-tert-butyl-5-methyl-4-hydroxyphenyl)propionate], which is available from BASF under the name of IRGANOX 245, 1,6-hexanediol-bis[3-(3,5-di-tert-butyl-4-hydroxyphenyl)propionate, which is available from BASF under the name of IRGANOX 259, 4-bis-(n-octylthio)-6-(4-hydroxy-3,5-di-tert-butylanilino)-1,3,5-triazine, which is available from BASF under the name of IRGANOX 565, pentaerythrityl-tetrakis[3-(3,5-di-tert-butyl-4-hydroxyphenyl)propionate, which is available from BASF under the name of IRGANOX 1010, 2,2-thio-diethylenebis [3-(3,5-di-tert-butyl-4-hydroxyphenyl)propionate], which is available from BASF under the name of IRGANOX 1035, octadecyl-3-(3,5-di-tert-butyl-4-hydroxyphenyl)propionate, which is available from BASF under the name of IRGANOX 1076, N,N'-hexamethylenebis(3,5-di-tert-butyl-4-hydroxyhydrocinnamide), which is available from BASF under the name of IRGANOX 1098, 3,5-ditert-butyl-4-hydroxy-benzylphosphonate-diethyl ester, which is available from BASF under the name of IRGAMOD 295, 1,3,5-trimethyl-2,4,6-tris(3,5-di-tert-butyl-4-hydroxybenzyl)benzene, which is available from BASF under the name of IRGANOX 1330, tris-(3,5-di-tert-butyl-4-hydroxybenzyl)isocyanurate, which is available from BASF under the name of IRGANOX 3114, octylated diphenylamine, which is available from BASF under the name of IRGANOX 5057, 2,4-bis[(octylthio)methyl]-o-cresol, which is available from BASF under the name of IRGANOX 1520L, isooctyl-3-(3,5-di-tert-butyl-4-hydroxyphenylpropionate, which is available from BASF under the name of IRGANOX 1135, 2,4-bis(dodecylthiomethyl)-6-methylphenol, which is available from BASF under the name of IRGANOX 1726, 2,5,7,8-tetramethyl-2-(4,8,12-trimethyltridecyl)chroman-6-ol, which is available from BASF under the name of IRGANOX E201, and 5,7-di-tert-butyl-3-(3,4-dimethylphenyl) benzofuran-2(3H)-one which is available from BASF under the name of IRGANOX HP-136, and combinations thereof.

As the phosphorus-type antioxidant, mention can be made of triphenylphosphine, tri phenyl phosphite, tris(nonylphenyl)phosphite, tris(2,4-di-tert-butylphenyl)phosphite, which is available from BASF under the name of IRGAFOS 168, tris(2,4-dibutyl-5-methylphenyl)phosphite, tri(decyl)phosphite, tris[2-[[2,4,8,10-tetrakis(1,1-dimethylethyl)dibenzo[d,f] [1,3,2]dioxaphosphepin-6-yl]oxy] ethyl]amine, which is available from BASF under the name of IRGAFOS 12, bis(2,4-di-tert-butyl-6-methylphenyl) ethyl phosphite, which is available from BASF under the name of IRGAFOS 38, and biphenyl-4,4'-diyl-bis[bis(2,4-di-tert-butyl-5-methylphenoxy)phosphind which is available from Osaki Industry under the name of GSY-P1O1, and combinations thereof.

As the lactone-type antioxidant, mention can be made of a reaction product of 3-hydroxy-5,7-di-tert-butyl-furan-2-one with o-xylene (CAS No, 181314-48-7).

As the hydroxylamine-type antioxidant, mention can be made of an oxidation product of alkylamine of which the raw material is a reduced beef tallow and the like.

As the vitamin E type antioxidant, mention can be made of 3,4-dihydro-2,5,7,8-tetramethyl-2-(4,8,12-trimethyltridecyl)-2H-benzopyran-6-ol.

As the sulfur-based antioxidant, mention can be made of didodecyl 3,3-thiobispropionate, which is available from BASF under the name of IRGANOX PS800, and dioctadecyl 3,3-thiobispropionate, which is available from BASF under the name of IRGANOX PS802.

In one preferred embodiment of the present invention, the antioxidant is selected from hindered phenol-type antioxidants. In another preferred embodiment of the present invention, the hindered phenol-type antioxidant can be represented by the following formula (III):

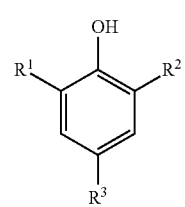

Formula (III)

in which,
- $R^1$ and $R^3$ represent, independently of each other, a linear or branched, saturated or unsaturated alkyl group, preferably having 4 or more carbon atoms, more preferably having 5 to 16 carbon atoms, and even more preferably having 6 to 12 carbon atoms, which is optionally interrupted by at least one heteroatom, such as O, S, and N;
- $R^2$ represents an alkyl group, preferably an alkyl group having 1 to 3 carbon atoms, and more preferably a methyl group.

In formula (III), $R^1$ and $R^3$ preferably represent a linear and saturated alkyl group. Preferably, $R^1$ and $R^3$ in formula (I) represent an alkyl group interrupted by at least one carbonyl group (—OC—), carbonyloxy group (—OC—O—), and/or a sulfur atom (—S—).

As other examples of the (e-2) antioxidants, the following commonly used antioxidants can also be included: phenols such as 4-methoxy phenol, 4-tert-butylcatechol; hydroquinones such as 1,4-dihyrdroxybenzene or 3,5-di-tert-butylbenzene-1,2-diol; quinones such as 1,4-benzoquinone or naphthalene-1,2-dione; aromatic nitro compounds such as 1,3-dinitrobenzene or 1,4-dinitrobenzene; nitrophenols such as 2-(sec-butyl)-4,6-dinitrophenol, 4-methyl-2-nitrophenol, or 4-methyl-2,6-dinitrophenol; amines such as phenothiazine, $N^1$-phenyl-$N^4$-propylbenzene-1,4-diamine, N-(1,4-dimethylpentyl)-N' phenyl-p-phenylenediamine, N,N-diethylhydroxylamine, or 2,2,6,6-tetramethylpiperidine; nitroso compounds such as N-nitrosophenylhydroxylamine ammonium salt; nitroxide compounds such as bis(1-oxyl-2,2,6,6-tetramethylpiperidin-4-yl) sebacate, 1-oxyl-2,2,6,6-tetramethylpiperidine, 1-oxyl-2,2,6,6-tetramethylpiperidin-4-ol, 1-oxyl-2,2,6,6-tetramethyl-4-n-butoxypiperidine; and mixtures thereof.

In one preferred embodiment of the present invention the (e-2) antioxidant can be selected from phosphorus-type antioxidants.

The (e-2) antioxidant may be present in an amount of 0.01% by weight or more, preferably 0.05% by weight or more, more preferably 0.1% by weight or more, and even more preferably 0.2% by weight or more, and in particular 0.5% by weight or more, and may be present in an amount of 8% by weight or less, preferably 5% by weight or less, more preferably 3% by weight or less, and even more preferably 2% by weight or less, relative to the total weight of the composition.

The curable silicone composition according to the present invention may also comprise any optional additive(s) usually used in the field, chosen, for example, from organopolysiloxanes other than components (A) and (B) above, organic or inorganic fillers, pigments, adhesion-imparting agents, resistance imparting agent, releasing agents, heat resistance agents, dyes, flame retardancy imparting agents, and mixtures thereof.

In one embodiment of the present invention, the curable silicone composition includes linear organopolysiloxane, branched organopolysiloxane, and/or resinous organopolysiloxane other than components (A) and (B) in an amount of 10% by weight or less, preferably 5% by weight or less, and more preferably 3% by weight or less, and in particular 1% by weight or less, relative to the total amount of the composition.

In another embodiment of the present invention, the curable silicone composition is free of linear organopolysiloxane, branched organopolysiloxane, and/or resinous organopolysiloxane other than components (A) and (B).

The curable silicone composition of the present invention can form a hard product by curing. The cured product may have a hardness of D40 or more with a type D durometer at 25° C. The hardness of this type D durometer can be determined according to JIS K 6253-1997.

The curable silicone composition of the present invention can be cured in a very short time interval with a high energy beam irradiation (e.g. ultraviolet radiation or the like). Therefore, in one embodiment, the curable silicone composition of the present invention is a UV curable silicone composition. For example, the curable silicone composition can be cured for 60 seconds or less, preferably 30 seconds or less, more preferably 15 seconds or less, even more preferably 5 seconds or less, and in particular 1.5 seconds or less, by irradiation of UV rays (wavelength: 365 nm, 200 mW/cm$^2$) from a metal halide lamp.

The curable silicone composition according to the present invention can be prepared by mixing the above-described essential and optional components in a conventional manner. The mixing method of each components can be conducted with a conventionally known method and is not particularly limited. For example, the mixing is carried out by simple stirring or mixing using a mixing device, such as a uniaxial or biaxial continuous mixer, a double roll, a Hobart mixer, a dental mixer, a planetary mixer, a kneader mixer, and a Henschel mixer.

[Sealing Agent and Sheet Film]

The present invention also relates to a sealing agent or a sheet film obtained by curing the curable silicone composition according to the present invention. The sealing agent of the present invention is preferably used for sealing a semiconductor element including an optical semiconductor. The sheet film of the present invention is preferably used as a sealing material layer or an adhesive sheet film for mass transfer process.

Examples of the semiconductor element include SiC, GaN, and the like. Examples of the optical semiconductor element include elements represented by light-emitting diodes (LED), photo diodes, photo transistors, laser diodes, and the like.

The sealing agent or sheet film according to the present invention is obtained by, for example, applying the curable silicone composition of the present invention on a film, tape, or sheet substrate, and then irradiating the curable silicone composition with UV rays to cure, and a cured film on the surface of the substrate is obtained. The film thickness of the cured film is not particularly limited, but is preferably in the range of 1 um to 10 mm or in the range of 5 um to 5 mm.

In the present specification, the term "UV" means electromagnetic radiation having a wavelength of about 10 nm to about 400 nm, and in ultraviolet curing, a wavelength of 280 nm to 400 nm can be employed. Examples of a device that generates UV rays include a metal halide lamp, a high-pressure mercury lamp, a medium-pressure mercury lamp, and an ultraviolet LED. The irradiance level of UV rays is not particularly limited, but is preferably 1 to 1,000 mW/cm$^2$, more preferably 5 to 500 mW/cm$^2$, and even more preferably 10 to 200 mW/cm$^2$ at 365 nm.

EXAMPLES

The present invention will be described in more detail by way of examples which however should not be construed as limiting the scope of the present invention.

The curable silicone compositions of the present invention will be described in detail by examples and comparative examples. In the examples and comparative examples, the following components were used to prepare the curable silicone compositions. In the formulae, Vi indicates a vinyl group, Me indicates a methyl group, and Ph indicates a phenyl group. In addition, the chemical formula of the organopolysiloxane component is shown in a simplified manner in the table, and the functional groups other than Me in M, D, or T units are shown in parentheses. The numerical values for the amounts of the components shown in the tables are all based on "part by weight" as active raw materials.

Components:
  (a-1): cyclic organopolysiloxane represented by the formula (MeViSiO)$_4$
  (a-2): organopolysiloxane resin represented by the average unit formula: $(Me_3ViSiO_{1/2})_{0.05}(Me_2ViSiO_{1/2})_{0.17}(MeSiO_{3/2})_{0.39}(PhSiO_{3/2})_{0.39}$
  (a-3): organopolysiloxane resin represented by the average unit formula: $(Me_2ViSiO_{1/2})_{0.04}(Me_3SiO_{1/2})_{0.4}(SiO_{4/2})_{0.56}$
  (a-4): linear organopolysiloxane, represented by the formula: $ViMe_2SiO(Me_2SiO_{2/2})_{310}SiMe_2Vi$ (b-1): (mercaptopropyl)methylsiloxane homopolymer (product name: SMS-992, obtained from Gelest)
(b-2): [(mercaptopropyl)methylsiloxane]-dimethylsiloxane copolymer (product name: SMS-142, obtained from Gelest)
(b-3) 1,4-bis(3-mercaptobutylyloxy)butane (product name: Karenz MT® BD1, obtained from Showa Denko)
(b-4) $M_{42}T^{SH}_{41}Q_{17}$ resin (SH content 14.2%)
(b-5) $M_{44}T^{SH}_{42}Q_{12}$ resin (SH content 14.6%)
(c): 2-hydroxy-2-methyl-1-phenyl-1-propanone (product name: Omnirad 1173, obtained from IGM RESINS B.V.)
(d) 2,6-di-tert-butyl-4-methylphenol (BHT)
(e-1): propoxylated glycerol (1PO/OH) triacrylate (product name: Genorad 16, obtained from Rahn)
(e-2): triphenylphosphine

[Evaluation]

(Viscosity)

The viscosity of the prepared curable silicone composition of each examples was measured with a rheometer from Antonpaar with 40 mm cone plate at 2 degree angle at a shear rate of 20/s at 25° C.

(Pot-Life)

The obtained curable composition of each examples were kept at 25° C. for 24 hours under an ambient condition in a light place, and the viscosities of the compositions were measured. Compositions in which the viscosity increases less than 10% are shown as "OK".

(Curability)

The obtained curable composition of the examples were exposed to UV radiation from a metal halide lamp (365 nm, 200 mW/cm²) for one second. Compositions in which a cured product was obtained was shown as "OK".

(Hardness)

Cured products in a sheet shape having a 1 mm thickness were obtained with the prepared curable compositions. The harnesses of the sheet products were measured with a type D durometer at 25° C. in accordance with JIS K 6253-1997.

(Die Shear Strength)

The obtained curable composition of each examples was uniformly applied to a glass plate. Another glass plate was then laminated on the composition and the compositions was cured with UV radiation from a metal halide lamp (365 nm, 200 mW/cm²) to obtain a layer having 1 mm thickness. Die shear strength was measured using a Die Shear tester (DAGE 4000 bond tester manufactured by Nordson DAGE). Samples having 2 MPa or more of die shear strength are shown as "OK".

(Coloration)

The curable silicone composition was filled into a mold having a concavity with a predetermined shape and was irradiated at the liquid surface from above with ultraviolet light using a metal halide lamp (365 nm, 200 mW/cm²). The obtained plate-like cured product having a thickness of 2 mm was subjected to transmittance measurement at 450 nm at 25° C. The cured product was then heated at 260° C. for 10 minutes. The transmittance at 450 nm at 25° C. of the cured product after the heat treatment was then measured in the same manner. Samples having 10% or less of change of the transmittance are shown as "OK".

The results are summarized in the tables below.

TABLE 1

| Components | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| a-1 $D(Vi)_4$ | 34.7 | 34.3 | 34.5 | 24.7 | 28.7 | 25.3 | 12.4 | — | 34.7 |
| a-2 $M_5$-$M(Vi)_{17}$-$T_{39}$-$T(Ph)_{39}$ | — | — | — | — | — | — | 60.3 | — | — |
| a-3 $M(Vi)_4$-$M_{40}$-$Q_{56}$ | — | — | — | — | — | — | — | 30.8 | — |
| a-4 $M(Vi)$-$D_{310}$-$M(Vi)$ | — | — | — | — | — | — | — | 39.2 | — |
| b-1 | 63.2 | 62.7 | 63.0 | — | — | — | — | — | 63.2 |
| b-2 | — | — | — | — | — | — | — | 29 | — |
| b-3 | — | — | — | — | — | — | 27 | — | — |
| b-4 $M_{42}T^{SH}_{41}Q_{17}$ | — | — | — | 72.8 | 68.8 | — | — | — | — |
| b-5 $M_{44}T^{SH}_{42}Q_{12}$ | — | — | — | — | — | 72.2 | — | — | — |
| c | 1 | 1 | 1 | 1 | 1 | 1 | 0.1 | 1 | 1 |
| d | 1 | 1 | 1.5 | 1.5 | 1.5 | 1.5 | — | — | — |
| e-1 | 0.1 | — | — | — | — | — | — | — | — |
| e-2 | — | 1 | — | — | — | — | 0.2 | 0.05 | — |
| Total | 100 | 100 | 100 | 100 | 100 | 100 | 100 | 100.05 | 98.9 |
| SH/Vi ratio (mole) | 1.10 | 1.03 | 1.10 | 1.10 | 0.9 | 1.10 | 0.8 | 0.8 | 1.10 |
| Evaluation | | | | | | | | | |
| Viscosity (mPa · s @ 25° C.) | 22 | 22 | 22 | 150 | 150 | 25 | 1500 | 1450 | 22 |
| Hardness | D71 | D71 | D71 | D72 | D70 | D65 | A70 | A60 | D45 |
| Die shear strength | OK | OK | OK | OK | OK | OK | NG | NG | OK |
| Cure | OK | OK | OK | OK | OK | OK | OK | OK | OK |
| Pot-life @ 25° C. | OK | OK | OK | OK | OK | OK | OK | OK | Gelated |
| T % change | OK | OK | OK | OK | OK | OK | OK | OK | OK |

As can see from the results from Table 1, the embodiments of the curable silicone composition according to the present invention can be cure quickly by UV radiation, show a low viscosity, have a good storage stability with a long pot-life even though they include mercapto functional silicones, and form a cured product having a high hardness.

Therefore, it can be said that the curable silicone composition according to the present invention are very useful for encapsulation applications in the manufacture of semiconductor packages, in particular LED packages.

What is claimed is:

1. A curable silicone composition comprising:
   (A) at least one organopolysiloxane having at least two alkenyl groups per molecule;
   (B) at least one mercapto functional organopolysiloxane having at least two thiol groups per molecule;

(C) at least one photopolymerization initiator; and
(D) 2,6-di-tert-butyl-4-methylphenol (BHT),
wherein the composition has a viscosity of less than 200 mPa·s at 25° C., and
wherein the (B) mercapto functional organopolysiloxane comprises (mercaptopropyl) methylsiloxane homopolymer or MT$^{SH}$Q resin.

2. The composition according to claim 1, wherein the (A) organopolysiloxane having at least two alkenyl groups per molecule comprises at least one cyclic organopolysiloxane.

3. The composition according to claim 2, wherein the cyclic organopolysiloxane is represented by the following formula (I): $(R_2SiO)_m$ in which, R indicates the same or different monovalent hydrocarbon, which can be optionally substituted with at least one halogen, wherein at least two of R per molecule represent alkenyl groups; and m is an integer of 4 to 50.

4. The composition according to claim 1, wherein the (A) organopolysiloxane having at least two alkenyl groups per molecule has alkenyl groups in an amount of 20 mol % or more and 80 mol % or less relative to the total amount of the silicon atom-bonded organic groups.

5. The composition according to claim 2, wherein the (A) organopolysiloxane having at least two alkenyl groups per molecule comprises the cyclic organopolysiloxane having at least two alkenyl groups per molecule in an amount of 50% by weight or more, relative to the total amount of the component (A).

6. The composition according to claim 1, wherein the (A) organopolysiloxane having at least two alkenyl groups per molecule includes linear organopolysiloxane, branched organopolysiloxane, and/or resinous organopolysiloxane in an amount of 10% by weight or less relative to the total amount of the composition.

7. The composition according to claim 1, wherein the (A) organopolysiloxane having at least two alkenyl groups per molecule is present in an amount of 10% by weight or more and 70% by weight or less relative to the total weight of the composition.

8. The composition according to claim 1, wherein the (B) mercapto functional organopolysiloxane is present in an amount of 30% by weight or more and 90% by weight or less relative to the total weight of the composition.

9. The composition according to claim 1, wherein the molar ratio of the thiol groups to alkenyl groups included in the composition is 0.5 or more and 2.0 or less.

10. The composition according to claim 1, wherein the (C) photopolymerization initiator comprises the following:
(c-1) an alpha-hydroxyacetophenone,
(c-2) a combination of an alpha-hydroxyacetophenone and an alpha-aminoalkylphenone, or
(c-3) a combination of an alpha-hydroxyacetophenone and a mono-acylphosphine oxide.

11. A sealing agent or sheet film formed with the curable silicone composition according to claim 1.

* * * * *